United States Patent [19]

Gulley

[11] Patent Number: 4,711,735

[45] Date of Patent: Dec. 8, 1987

[54] COOLANT ADDITIVE WITH CORROSION INHIBITIVE AND SCALE PREVENTATIVE PROPERTIES

[76] Inventor: Harold J. Gulley, 3321 E. 149th St., #2, Cleveland, Ohio 44120

[21] Appl. No.: 906,392

[22] Filed: Sep. 12, 1986

[51] Int. Cl.$^4$ .............................................. C09K 5/00
[52] U.S. Cl. ........................................ 252/75; 252/76; 252/77; 252/180; 252/181; 252/395; 252/396; 524/549; 524/577; 524/811; 524/832; 526/272
[58] Field of Search .................... 252/75, 76, 77, 180, 252/181, 395, 396; 524/549, 577, 811, 832; 526/272

[56] References Cited

U.S. PATENT DOCUMENTS

| | | | |
|---|---|---|---|
| 2,386,183 | 10/1945 | Balcar | 252/396 |
| 2,723,956 | 11/1955 | Johnson | 252/180 |
| 2,937,145 | 5/1960 | Cutlip et al. | 252/75 |
| 2,972,581 | 2/1961 | Johnson et al. | 252/75 |
| 3,959,166 | 5/1976 | Oberhofer et al. | 252/75 |
| 4,105,592 | 8/1978 | Collins | 252/545 |
| 4,382,008 | 5/1983 | Boreland et al. | 252/75 |
| 4,446,045 | 5/1984 | Snyder et al. | 252/180 |
| 4,495,336 | 1/1985 | Hausler et al. | 252/395 |
| 4,587,028 | 5/1986 | Darden | 252/76 |

*Primary Examiner*—Robert Wax
*Attorney, Agent, or Firm*—H. Jay Spiegel

[57] ABSTRACT

Disclosed herein is an improved coolant additive having corrosion inhibitive and scale preventative properties. In particular, the inventive additive in its various embodiments is specifically designed to avoid the use of silicates which, as is well known, form deposits which coat the surfaces and passageways of heavy duty diesel and other cooling systems, resulting in shortened life and reduced efficiency thereof. The inventive additive includes sodium hydroxide and/or alkal metal carbonate, ricinoleic acid, Reomet 41, Thiotax, various forms of SMA copolymers, sodium benzoate, sodium nitrate, chelant(s), antifoam agents, dye/pH indicator and soft water (composition solvent), mixed together in predetermined proportions with the various embodiments of the inventive additive including other constituent substances.

17 Claims, No Drawings

COOLANT ADDITIVE WITH CORROSION INHIBITIVE AND SCALE PREVENTATIVE PROPERTIES

BACKGROUND OF THE INVENTION

The prior art teaches that to maintain the cooling system design efficiency of a heat exchanger/heat engine, the coolant must include cleaning and inhibiting compositions. The cleaning component is to be provided so as to prevent build-up of scale and other substances on the internal walls of the cooling system. The inhibitor component better known as "metallic catalysis" is provided to mitigate the corrosiveness of the fluid within the cooling system and further to provide anti-corrosion protection for the inner surfaces of the system. As present, cooling systems for diesel and other types of internal combustion engines are fabricated from many different types of metals and alloys with the metals and alloys being specifically chosen for the particular applications of the engine. While the use of such dissimilar materials is advantageous from constructional standpoint, certain difficulties are experienced in connection with the use of dissimilar materials. For example, it is quite difficult to provide a satisfactory scale preventing-corrosion inhibiting system in cooling solutions which are used in such an apparatus. Corrosion inhibiting fluids and additives are well known in the prior art and are designed for use with systems constructed from various metals. To date, however, none of these cooling fluids and additives have provided satisfactory scale-corrosion inhibition for widely varying cooling system materials. Applicant is aware of U.S. Pat. Nos. 3,962,109; 4,382,870; 2,723,956; 2,802,788; 2,972,581; 2,994,664; 3,079,343; and 3,959,166. These U.S. patents are believed to be related to the general environment of intended use of the present invention but the present invention is believed to be distinct therefrom both conceptually and patentably.

Research has led to the conclusion that the major source of scale deposition on the internal surfaces of a cooling system is through the silicification of compounds including silicate (water glass). For example, catalyzed silicate ($SiO_2/SiO_3$, i.e., silicon dioxide to silicate) of sodium (*Na; in water) forms, in the presence of magnesium, ion deposits of magnesium silicate/silica while simultaneously and continually precipitating and depositing heavy metal ions including silicates and silica. These deposits are substantially insoluble and are not removable by conventional means. In fact, certain types of scale such as magnesium silicate ($Mg_3Si_4O_{10}(OH)_2$)/talc; $K_2Mg,Fe)_2Al_6(Si_4O_{10})_3(OH)_{12}$/greensands, ore(s)/gangue(s), etc., magnesium phosphate, sodium silicate are unaffected by conventional types of organic compounds which may have been designed to remove such deposits. Further, these substances have high resistance to acids, alkalines and heat. In fact, the only known means for removing such deposits consists of either boiling the disassembled parts in hot alkyline solutions or treating the surfaces with hydrofluoric acid, which is one of the most dangerous acids presently known and certainly not recommended for general use.

*NA=Narium/sodium ... (Na: fr. International Scientific Vocabulary Natron)

As an example of the deficiencies in the prior art, the alkali metallic silicate compound deposits described above which are a major cause of shortened cooling system life, are not prevented when one uses the additive disclosed in U.S. Pat. No. 3,962,109. The additive disclosed therein includes a compositional metallic inhibitor and a supplemental aqueous compositional cleaner/inhibitor coolant additive. Since the additive disclosed in this patent includes the use of silicate compounds, the above-described scale deposits will inherently occur through the use of this product and since such deposits are not removable in the practical sense, the use of this additive may cause serious problems in the cooling system over long periods of time.

Some common properties which make organics (such as dibasic acids, benzoate, cinnamic acids ... ,) catalyses/chemisorption perform, often times, better than some of the prior used iorganic catalyses (such as, —$CrO_3$, $Cr_2O_7$, $SiO_2/SiO_3$, $NO_2$, $NO_3$, $HCO_3$, $CO_3$, $PO_4$, and others); despite, organic catalyses effectiveness is the fact that they are not being widely used. Such materials (as oils) for chemisorption have been used quite effectively for centuries.

A practical example of chemisorption is the boundary lubrication of moving metal parts in machinery. A film of oil forms a chemisorbed layer at the interface and averts the high frictional forces that would otherwise exist.

Correspondingly, it is significant—however—that organic catalyses perform their beneficial protection via the same mechanism of chemisorption as do the better inorganic catalysis and/or catalyses, e.g., —$CrO_3$ and $SiO_3$. These anions maintain co-valent, shared bonds between the same anionic element (oxygen) thereby migrating and performing as a radical ($SiO_2/SiO_3$; $CrO_3$) in electrolytes.

The same is true for organic catalyses, i.e., they share a co-valent arrangement (radical configuration, e.g., $C_6H_5COO^-$ ... /$C_6H_5COOH$; $CH_3(CH_2)_{16}COO^-$ ... /$CH_3(CH_2)_{16}COOH$ ... and others. Further, organic catalyses have been found to be much more thermally stable chemically than ionic bonding inorganic components/electrolytes ($NaHCO_3$, $NaNO_2$, $NaNO_3$, borax ... $Na_3PO_4$).

Additionally, dibasic acids are effective over a much broader pH range, having capacities due to their double-terminal carboxyl groups and ability to simultaneously exist as an acid-salt/ester, e.g., maleic acid/ester, HOOCCH:CHOONa.

Some scribed examples of catalyses chemisorption mechanism of activity:

Inorganic

$CrO_3$+WATER+BUFFER=$H_2CrO_4$+ADMIXTURE (Make-up).

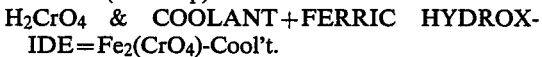
$H_2CrO_4$ & COOLANT+FERRIC HYDROXIDE=$Fe_2(CrO_4)$-Cool't.

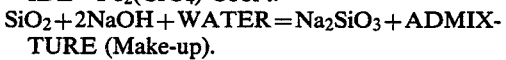
$SiO_2$+2NaOH+WATER=$Na_2SiO_3$+ADMIXTURE (Make-up).

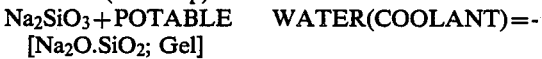
$Na_2SiO_3$+POTABLE WATER(COOLANT)=-[$Na_2O.SiO_2$; Gel]

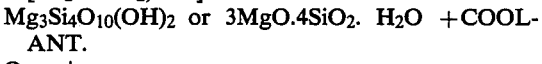
$Mg_3Si_4O_{10}(OH)_2$ or $3MgO.4SiO_2$. $H_2O$ +COOLANT.

Organic

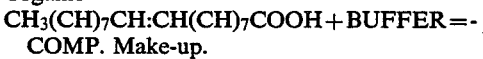
$CH_3(CH)_7CH:CH(CH)_7COOH$+BUFFER=-COMP. Make-up.

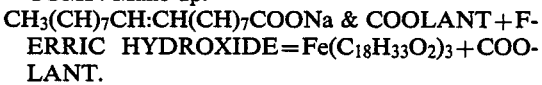
$CH_3(CH)_7CH:CH(CH)_7COONa$ & COOLANT+FERRIC HYDROXIDE=$Fe(C_{18}H_{33}O_2)_3$+COOLANT.

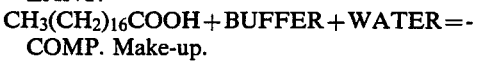
$CH_3(CH_2)_{16}COOH$+BUFFER+WATER=-COMP. Make-up.

$CH_3(CH_2)_{16}COONa$ & COOLANT + FERRIC HYDROXIDE = $Fe(C_{18}H_{35}O_2)_3$ + COOLANT.

Collating the mechanism of the above inorganic vs. organic formulae per structural arrangements portend a means for devising methods to assist in classifying, collating components per their performance and to further the best pragmatic and discernible interpretations possible of conducted works/studies.

More importantly, the structural formulae are used to show that those catalyses that are most effective are similar in their scribed structure and performance/chemisorption, to water on surfaces wetted by it.

Take for example, compounds of hydration ($Na_2MoO_4.2H_2O$; $CuSO_4.5H_2$)...) Their structural formulae are quite similar to catalyzed silicate of sodium and chromic acid $Na_2O.SiO_2/Na_2SiO_3$; $H_2O.CrO_3/H_2CrO_4$ ...) and as such adhere to the definition of catalysis.

SUMMARY OF THE INVENTION

The present invention is designed to overcome the deficiencies of the prior art so as to provide a coolant additive which performs all of the advantageous features found in prior art additives while additionally providing improved corrosion inhibitive and scale preventive aspects.

The present compositional invention is formulated to provide complete cooling system treatment. It contains a balanced film-forming, chemisorption inhibitor system that protects metals/alloys in a cooling system against corrosion, while maintaining a favorable alkaline balance. Further, its chemisorbed action ties up the hardness and other insolubles in the cooling system fluids to prevent the build-up of rust or scale. Additional, desired benefits of the present invention are as follows:

provides adequate engine cooling protects against foaming protects all metals in the cooling system from corrosive attack keeps engine free from heat-absorbing sludge and mineral scale build-up, which would dramatically reduce the engine's heat transfer capacity is compatible with all antiboil/antifreeze-ethylene glycol-based coolants extends the life of coolant (by requisite supplemental additions).

has no harmful effects on hoses and other nonmetallic parts in the cooling system provides cavitation-erosion protection eliminates harmful effects of electrolysis extends equipment life, while providing "in-service" deposit free surfaces provides design cooling system efficiency eliminates "off-line" cleaning, reduces downtime, and maintenance costs.

In general, it has been found that the above-described benefits as well as others are achieved by using a corrosion inhibitor/catalysis composition consisting of an aqueous compositional corrosion inhibitor system, with the corrosion inhibitor system including in weight percent of from about 0.017 to about 0.420 percent ricinoleic acid, practical gr., from about 0.007 to about 0.083 percent "Reomet 41" (azole-type Cu-inhibitor), from about 0.18 to about 3.00 percent carbonate ion (—$HCO_3$, $CO_3$ and/or lime), from about 0.50 to about 1.50 percent "THIOTAX" dry (2-MBT; Cu Inhibitor), from about 0.170 to about 4.00 percent SMA (Styrene Maleic Anhydride, ARCO's) from about 0.042 to about 2.00 percent Benzoic Acid, from about 0.420 to about 4.20 percent Benzoate Ion, from about 0.330 to about 3.30 percent Nitrite Ion, from about 0.370 to about 3.70 percent Nitrate Ion, from about 0.420 to about 3.00 percent "EVANACID 3CS" (carboxymethylmercaptosuccinic acid), from about 0.170 to about 0.670 percent N-Benzylethanolamine and/or from about 0.50 to about 1.50 percent of a combination of soluble thiazole/azole compounds.

This is based on ASTM D 1384—Standard requisite test volume of 33⅓ percent liquid, compositional, concentrate per Liter of coolant, i.e., 33⅓ vol. % Aqueous concentrate, balance- 50/50 vol. % each of the Standard's Specified 'Corrosive Water' (q.v.) and a suitable ethylene glycol.

In another aspect, the instant invention concerns a method of minimizing scale-corrosion in a cooling system composed of a plurality of metals and alloys which comprises, providing a scale-corrosion mitigative coolant composition admixture which includes as least one water soluble alcohol and an effective scale-corrosion inhibiting system, with the corrosion inhibited system including, in weight percent based on the aqueous composition concentrate, from about 0.017 to about 0.420 percent ricinoleic Acid, from about 0.007 to about 0.083 percent "Reomet 41", from about 0.180 to about 3.00 percent Carbonate Ion, from about 0.50 to about 1.50 percent "THIOTAX", Dry (2-MBT), from about 0.170 to about 4.00 percent SMA, from about 0.420 to about 4.20 percent Benzoate Ion, from about 0.042 to about 2.00 percent Benzoic Acid, from about 0.330 to about 3.30 percent Nitrite Ion, from about 0.370 to about 3.70 percent Nitrate Ion, from about 0.420 to about 3.00 percent "EVANACID 3CS", from about 0.170 to about 0.670 percent N-Benzylethanolamine and/or from about 0.50 to about 1.50 percent of a combination soluble thiazole/azole compounds.

Thus, the present invention is directed to an aqueous composition which includes a unique combination of additives so as to alleviate scale deposition and so as to impart corrosion protection and inhibition for coolant compositions used in cooling systems fabricated from a plurality of dissimilar metals and alloys such as for example copper, solder, brass, steel, cast iron and cast aluminum.

In a further aspect, the inventive additive may be provided with at least one suitable volatile corrosion inhibitor designed to inhibit boiling/gases-steam of the cooling fluid.

Accordingly, it is a first object of the present invention to provide a coolant additive which simultaneously prevents scale deposits while providing a synergistic combination of inhibitors and catalyses which effectively prevent scale and corrosion in cooling systems of internal combustion engines and is usable for a long period of time without lowering the anticorrosive properties of the fluids.

It is a further object of the present invention to provide such an additive with an aqueous compositional metal corrosion inhibitor which can feasibly be diluted with the usual anti-boil/anti-freeze agents.

It is a further object of the present invention to provide a composition for adding to cooling system fluids which may be associated with the cooling fluid at any stage thereof such as for example, by being packaged with the anti-freeze solution when manufactured or which could be added to an existing anti-freeze mixture already contained within the cooling system of the vehicle.

It is a still further object of the present invention to provide such an additive which includes no silicate compounds so that the build-up of scale deposits including silicon is necessarily prevented.

It is a still further object of the present invention to provide such an additive with substances which limit and reduce the corrosion of the metallic materials comprising the cooling system.

These and other objects, aspects and features of the present invention will be better understood from the following detailed description of the preferred embodiments thereof.

SPECIFIC DESCRIPTION OF THE PREFERRED EMBODIMENTS OF THE PRESENT INVENTION

TABLE A

Trade Names Used in This Disclosure

| Trade Names | Chemical | Mfr./Inc. |
|---|---|---|
| 1. "Reomet 41" | Moiety of Benzotriazole | Ciba-Geigy Corp. |
| 2. THIOTAX | Mercaptobenzothiazole | Monsanto Corp. |
| 3. Ucon 50 HB 5100 | Polyoxyalkylene glycol | Union Carbide Corp. |
| 4. "EVANACID 3CS" | Carboxymethylmercapto-succinic Acid | EVANS' Chemetics/ W. R. Grace |
| 5. Triton CF 10 | Ethoxylated nonylphenol | Rohm-Haas |
| 6. Triton Df 12 | Ethoxylated, Surfactant | Rohm-Haas |
| 7. Pluronic L 61 | Polyoxyalkylene, Glycol | BASF |
| 8. Sarkosyl NL-30 | N—Acylated Sarcosines | Ciba-Geigy Corp. |
| 9. CONCO AAS-98S | LAS; Alkylsulfonate, Linear | Conoco, Inc./ Dupont, Inc. |
| 10. Sumine 2055 | N—Benzylethanolamine | Conoco, Inc./ Dupont, Inc. |
| 11. Sulfonate AA-9 | ABS, Sodium dodecyl-benzene sulfonate | Tennessee Chemical Company |
| 12. Sulfonate OA-5 | Sulfonated Oleic Acid | Tennessee Chemical Company |

The aqueous scale-corrosion composition concentrate of the present invention should be incorporated into a coolant which includes at least one suitable antiboil fluid and/or water soluble alcohol having the present invention composition dissolved therein. In this regard, various types of alcohols may be utilized and the preferred alcohol is that which is conventionally utilized in so-called permanent anti-freeze systems, i.e., ethylene glycol. However, other alcohols may be used without departing from the spirit and scope of the instant invention.

The aqueous composition concentrate of the present invention includes a unique inhibiting system. The system contains ricinoleic Acid, "Reomet. 41", "THIOTAX"-2(MBT), SMA, Benzoic Acid, Benzoate Ion, Nitrite Ion, Nitrate Ion, "EVANACID 3CS". Additionally, other adjuvants may be added thereto as desired.

The benzoate ion is achieved by using an alkali metal (e.g., sodium, preferred—lithium or potassium) Benzoate Material. The same is true with respect to the nitrite ion. That is, sodium and/or the preferred lithium or potassium nitrite can be utilized to produce nitrite ions. In addition, the thiazole/azole materials can be any suitable copper protector such as MBT and/or one of its derivatives or a monoaryl triazole or polytriazole and/or their derivatives.

Further, in the preferred practice of the invention, it is desirable to add a polymeric dispersant to the composition, such as a water soluble carboxylic acid polymer, e.g., styrene maleic anhydride (SMA) copolymer with a more preferred dispersant being a modified amide/imide with an average molecular weight ranging between about 200 to about 3500. This range is chosen because applicant has found through experimentation that the use of SMA of a molecular weight within this range reduces deposition and produces less shearing of the SMA molecules. If one desires to use an SMA molecule without the SMA being of the modified amide type, the molecular weight range may be effective to about 500 to about 50,000. Also, it is usually desirable to add from about 0.50 to about 1.0 percent by volume of N-benzylethanolamine to the aqueous composition concentrate of the invention as an acid neutralizer, so as to provide it with adequate reserve alkalinity.

The following table sets forth the preferred composition of the inhibitor composition components utilized in an antiboil/antifreeze (alcohol) coolant admixture of the invention wherein the compositional ranges of the various inhibiting components are by weight percent of the total composition.

TABLE B a. From about 0.017 to about 0.420 percent ricinoleic Acid;
b. From about 0.007 to about 0.083 percent "Reomet 41";
c. From about 0.50 to about 1.5 percent "THIOTAX"(2-MBT);
d. From about 0.170 to about 4.00 percent SMA;
e. From about 0.042 to about 2.00 percent Benzoic Acid;
f. From about 0.420 to about 4.00 percent Benzoate Ion;
g. From about 0.330 to about 3.30 percent Nitrite Ion;
h. From about 0.370 to about 3.70 percent Nitrate Ion;
i. From about 0.420 to about 3.00 percent "EVANACID 3CS";
j. Balance, Soft Water; Compositional Solvent.

The above-described aqueous scale-corrosion composition concentrate finds exceptional utility as an admixture with cooling solution for various types of engines which have cooling systems that utilize dissimilar metals. However, in addition to the list of ingredients, other additives may also be employed. For example, dyes, surfactants, hydrotropes, and anti-foaming agents may also be added to the basic composition.

For example, suitable dyes (preferred color: green to blue) include at least one of the family of Alizarine Cyanine Green G Extra 100%, Uranine and/or an anthene or acid family permanent/dyes. Typical antifoaming agents include silicone emulsions and/or polyglycol (for example, Pluronic L-61, polyalkylene, 50-HB-5100 and polypropylene glycols 150,425 and 1025).

TABLE C

ASTM D-1384 LABORATORY GLASSWARE CORROSION TEST RESULTS

Conditions of Test: A set of six 2 by 1 in. metal specimens, all "bundle" in electrical contact, immersed in 33⅓ volume % solution of the compositional Coolant Additive/Cleaner-Deposit Release Agent which is mixed with ethylene glycol and then diluted with Corrosive Water (i.e., distilled with 100 ppm each Cl, SO₄ and bicarbonate as sodium salts) for each Coolant at 190 F. (88 C.).
DURATION OF TEST 336 HOURS (14 days)
EXPERIMENTAL

| | | | | Commercial Additive | | | | | |
|---|---|---|---|---|---|---|---|---|---|
| | N-2000 | A | B | C | D | E | F | G | H |
| | Concentration, g/L, of Coolant | | | | | | | | |
| Additive Coolant | | | | | | | | | |
| H₂O, Soft | 27.53 | 25.51 | 25.30 | 27.02 | 27.03 | 25.62 | 25.66 | 25.37 | 25.17 |
| NaOH, 50%(Caustic) | 0.80 | 2.99 | 3.00 | 2.35 | 2.35 | 2.30 | 2.30 | 2.30 | 2.66 |
| TTA(Tolyltriazole) | 0.33 | — | — | — | — | — | — | — | — |
| 2-MBT(Mercaptobenzo-thiazole,Dry) | 0.33 | 0.33 | 0.33 | 0.33 | 0.33 | 0.33 | 0.33 | 0.33 | 0.33 |
| Triton CF 10 | 0.07 | 0.07 | 0.07 | 0.07 | 0.07 | — | — | — | — |
| SMA(Styrene Maleic Anhydride) | 0.17 | 0.17 | 0.17 | 0.17 | 0.17 | 0.17 | 0.17 | 0.17 | 0.17 |
| Sodium Gluconate,50% | .70 | — | — | — | — | — | — | — | — |
| Diethylaminoethanol | 0.40 | — | — | — | — | — | — | — | — |
| EDTA, 82% | 1.67 | — | — | — | — | — | — | — | — |
| Thioglycolic Acid | 0.33 | — | — | — | — | — | — | — | — |
| Borax, 5 mol. H₂O | 0.42 | 0.42 | 0.42 | 0.42 | 0.42 | — | — | — | — |
| Sodium Nitrite | 0.50 | — | — | — | — | 0.13 | 0.13 | 0.13 | 0.13 |
| Ucon 50 HB 5100 (Uion Carbide) | 0.03 | — | — | 0.03 | 0.03 | 0.03 | 0.03 | 0.03 | 0.03 |
| Dow 'A', Silicone (Antifoam) | 0.02 | — | — | — | — | — | — | — | — |
| Dye, Uranine C (Dow) | .001 | — | — | — | — | — | — | — | — |
| N—Benzylethanolamine | — | — | 0.27 | 0.27 | 0.27 | — | — | — | — |
| Sodium Sarcosine | — | — | 0.17 | 0.67 | — | — | — | — | — |
| Carboxymethylthio-succinic Acid | — | 1.67 | 1.67 | — | — | 1.42 | 1.42 | 1.42 | 1.42 |
| Citric Acid | — | 0.33 | 0.33 | — | — | — | — | — | — |
| PPL[a] Glycol 1025 | — | 0.02 | 0.02 | 0.02 | 0.02 | — | — | — | — |
| Ricinoleic Acid (Baker's P-10) | — | 0.07 | 0.07 | 0.20 | 0.20 | 0.07 | 0.07 | 0.07 | 0.07 |
| Reomet 41(Cu-Inhibitor) | — | 0.10 | 0.10 | 0.08 | 0.07 | 0.05 | 0.05 | 0.05 | 0.05 |
| Sodium Benzoate | — | 0.50 | 0.50 | 0.50 | 0.50 | 0.83 | 0.83 | 0.83 | 0.83 |
| H-10, Antifoam | — | 0.27 | 0.03 | — | — | — | — | — | — |
| Sodium Nitrate | — | 0.50 | 0.50 | 0.50 | 0.50 | 1.33 | 1.33 | 1.33 | 1.33 |
| Gluconic Acid(S-Salt) | — | 0.35 | 0.35 | — | — | — | — | — | — |
| Phenolphthalein(Dye) | — | 0.02 | 0.02 | 0.02 | 0.02 | 0.02 | 0.02 | 0.02 | 0.02 |
| Pluronic L 61 | — | — | — | .007 | .007 | — | — | — | — |
| Sebacic Acid,Pract. | — | — | — | 0.67 | — | — | — | — | — |
| Malonic Acid | — | — | — | — | 0.50 | — | — | — | — |
| Sarkosyl NL-30 | — | — | — | — | 0.83 | — | — | — | — |
| PPL Glycol 425 | — | — | — | — | — | 0.07 | — | 0.07 | 0.07 |
| Conco AAS-98 S | — | — | — | — | — | 0.17 | — | — | — |
| Benzoic Acid | — | — | — | — | — | 0.50 | 0.50 | 0.50 | 0.42 |
| Sumine 2055 | — | — | — | — | — | 0.27 | 0.27 | 0.27 | 0.27 |
| Triton DF 12 | — | — | — | — | — | — | 0.07 | — | — |
| Sulfonate AA-9[b] | — | — | — | — | — | — | 0.13 | — | — |
| Sulfonate OA-5[c] | — | — | — | — | — | — | — | 0.42 | 0.17 |
| H₃BO₃ (Boric Acid) AR | — | — | — | — | — | — | — | — | 0.17 |
| Coolant pH | | | | | | | | | |
| initial | 10.60 | 10.48 | 10.47 | 11.55 | 10.80 | 10.40 | 10.60 | 10.50 | 11.05 |
| final | 9.90 | 10.30 | 10.20 | 10.05 | 10.40 | 9.70 | 9.80 | 9.80 | 10.10 |

| | Corrosion Weight Loss mg/specimen | | | | | | | | | ASTM D* |
|---|---|---|---|---|---|---|---|---|---|---|
| Corrosion (mg/336 h) | | | | | | | | | | 3306 |
| copper | 6.3 | 3.3 | 5.8 | 3.1 | 3.7 | 3.1 | 5.0 | 5.3 | 6.1 | 10 |
| solder (70-30) | 15.9 | 82.1 | 124.6 | 31.5 | 49.6 | 12.7 | 11.8 | 11.0 | 22.2 | 30 |
| brass | 5.0 | 2.8 | 2.9 | 2.1 | 2.5 | 6.0 | 4.6 | 4.9 | 4.6 | 10 |
| steel | 1.0 | 0.8 | 14.2 | 0.1 | 1.2 | 2.1 | 2.5 | 2.3 | 2.2 | 10 |
| cast iron | +0.47 | 2.1 | 3.4 | +0.2 | 1.8 | 181.8 | 0.5 | 20.3 | 2.0 | 10 |
| cast aluminum | +1.2 | 573.4 | 574.2 | +0.7 | 374.9 | 22.4 | 29.0 | 10.0 | 44.0 | 30 |

[a]PPL/Polypropylene
[b]Sodium Dodecylbenzene Sulfonate
[c]Sulfonated Oleic Acid
*Describes the allowable maximum for each metal using ASTM 3-1384, corrosion results with + represent weight gain.

The present invention significantly improves the scale prevention-corrosion protection afforded various metals and alloys when contacted with an antiboil-antifreeze fluid (alcohol)-containing the invention aqueous composition concentrate. Also, the instant invention can be utilized to produce scale prevention-corrosion mitigating aqueous compositional catalyses concentrates which are silicate free. This is desirable in that silicate of sodium (water glass) produces irreversible magnesium silicate scale and subsequent continual aggregational scales which are insoluble. They are chemisorbed on the cooling system surfaces thereby insulating, and/or clogging orifices, ports, passageways and severely reducing design heat transfer.

The examples in Table C illustrate the benefits achieved when utilizing aqueous composition concentrate, i.e., examples "F", "C", "G", . . . of the instant invention in situations where contact is made with various metals and alloys. Table C's example N-2000 illustrates U.S. Pat. No. 3,962,109. Commercial product performance was tested as per ASTM standard D 1384. The evaluation of experimental aqueous composition concentrates was conducted in accordance with ASTM D 1384 Glassware Testing Standard.

The benefits of the instant invention are illustrated in Table C. Particularly, the potential for producing irreversible and aggregational scale deposition has been negated. None of the components of the instant invention equates the scale potential of silicified catalyses/inhibitors.

Tables D and E show two examples of mixtures which are considered to be within the purview of the present invention.

TABLE D

| Component | Percent by Weight |
|---|---|
| Sebacic Acid, Practical | 2.00 |
| Triton CF 10 | 0.20 |
| SMA(Styrene Maleic Anhy., Na Salt) | 0.50 |
| Ucon 50 HB 5100 | 0.10 |
| PPL Glycol 1025 (PPL = Polypropylene) | 0.05 |
| Borax, 5 Mol.H$_2$O | 1.25 |
| NaOH, 50% | 7.05 |
| Ricinoleic Acid, Practical | 0.60 |
| Thiotax, Dry 2-MBT (Azole) | 1.00 |
| Sodium Benzoate | 1.50 |
| Reomet—41 (Azole, Type) | 0.23 |
| Sodium Sarcosine | 2.00 |
| Sodium Nitrate | 1.50 |
| Pluronic L 61 (Polyoxyalkylene) | 0.02 |
| N—Benzylethanolamine | 0.80 |
| Phenolphthalein (Dye) | 0.05 |
| Balance, Soft Water | — |

TABLE E

| Component | Percent by Weight |
|---|---|
| Ricinoleic Acid, Practical | 0.20 |
| Reomet 41 (Azole, Type-Cu Inhibitor) | 0.15 |
| NaOH, 50% | 6.90 |
| Thiotax, Dry (2-MBT) | 1.00 |
| Triton DF 12 | 0.20 |
| Scripset 500 (SMA) | 0.50 |
| Sulfonate AA-9 | 0.40 |
| Benzoic Acid | 1.50 |
| Sodium Benzoate | 2.50 |
| Sodium Nitrite | 0.40 |
| Sodium Nitrate | 4.00 |
| "Evanacid 3CS" | 4.25 |
| Sumine 2055 | 0.80 |
| Ucon 50 HB 5100 | 0.10 |
| Phenolphtalein (Dye) | 0.05 |
| Balance--Soft Water | — |

With referrence to Table C, the additive depicted in Table D herein corresponds to additive C in Table C and the additive depicted in Table E herein corresponds to additive F in Table C.

An additional benefit of the present invention is the fact that benzoate and/or hydroybenzoic acid compounds serve as a durable organic buffer, rust inhibitor, and volatile corrosion inhibition as well as a general inhibitor for metals/alloys of cooling system constructions.

In practive, 4 to 6 oz of inhibitor (aqueous composition concentrate) are added to the conventionally packaged per gallon of alcohol (antiboil, glycol) to produce a suitable antiboil/antifreeze commercial composition. This material is then mixed with water (potable) to produce a coolant suitable for use with diesel and gasoline type internal combustion engines.

As a supplemental additive, 2 to 4 oz. per gallon of the requisite amount of potable water to fill the cooling system the required amount (aqueous, inhibitor) may be poured directly into the cooling system.

It must be stressed that the inventive additive may not remove depositions and scale build-ups which were created within the cooling system prior to the addition of the inventive additive. Further, the inventive additive may not be fully effective when used in cooling systems containing silicate inhibited coolants, or in systems lacking antiboil and/or antifreeze depressant additives. Further, the inventive additive does not impart in and of itself, freeze depressant properties.

The following are examples of mixtures which are considered to fall within the purview of the present invention:

(a) A scale preventive, deposition resistant, aqueous composition comprising a scale preventive system, the preventive system including in weight percent based on said aqueous composition from about 0.170 to about 4.0 percent Styrene Maleic Anhydride-copolymer having a molecular weight of from 500 to 50,000, or from 200 to 3500, modified amide/imide.

(b) A composition as described in section (a) above and further including a corrosion inhibitor system including, in weight percent based on an aqueous composition, from about 0.170 to about 0.420 percent ricinoleic acid and/or its derivatives, from about 0.007 to about 0.083 percent triazole moiety of benzotriazole, from about 0.50 to about 1.50 percent thiazole or mercaptobenzothiazole, from about 0.42 to about 4.0 percent benzoate ion, from about 0.33 to about 3.30 percent nitrate ion, from about 0.420 to about 3.0 percent carboxymethylmercaptosuccinic acid.

(c) A composition as described in section (a) above and further including a corrosion inhibitor system including, in weight percent based on an aqueous composition, from about 0.170 to about 0.420 percent ricinoleic acid and/or its derivatives, from about 0.007 to about 0.083 percent triazole moiety of benzotriazole, from about 0.50 to about 1.50 percent thiazole or mercaptobenzothiazole, from about 0.42 to about 4.0 percent benzoate ion, from about 0.33 to about 3.30 percent nitrate ion, from about 0.420 to about 3.0 percent carboxymethylmercaptosuccinic acid.

(d) A composition as described in either section (b) or section (c) in which the alkali metal is one of sodium, lithium or potassium.

(e) A composition as described in either section (b) or section (c) which further includes from about 0.37 to about 3.70 percent alkali metal nitrate ion, and from about 0.83 to about 4.0 percent alkali metal dodecylbenzene sulfonate.

(f) A composition as described in either section (b) or section (c) and further including from about 0.042 to about 2.0 percent benzoic acid or alkali metal benzoate.

(g) A composition as described in section (a) above which further includes a corrosion inhibitor system including, in weight percent based on an aqueous composition, from about 0.17 to about 3.0 percent sebacic acid and/or alkali metal sebacate, from about 0.42 to about 3.0 percent alkali metal sarcosinate, from about 0.017 to about 0.42 percent ricinoliec acid, from about 0.007 to about 0.083 percent "Reomet 41", from about 0.50 to about 1.50 percent mercaptobenzothiazole, from about 0.42 to about 4.0 percent benzoate ion, the alkali metal being one of sodium, lithium or potassium, and the composition further including from about 0.37 to about 3.70 percent alkali metal nitrate ion.

(h) A composition as described in section (a) above which further includes a corrosion inhibitor system including, in weight percent based on an aqueous composition, from about 0.17 to about 3.0 percent sebacic acid and/or alkali metal sebacate, from about 0.42 to about 3.0 percent N-Acylated Sarcosines, from about 0.17 to about 0.42 percent ricinoleic acid or alkali metal, from about 0.017 to about 0.42 percent ricinoleic acid, from about 0.007 to about 0.083 percent Moiety of Benzotriazole, from about 0.50 to about 1.50 percent mercaptobenzothiazole, from about 0.42 to about 4.0 percent benzoate ion, the alkali metal being one of sodium, lithium or potassium, and the composition further including from about 0.37 to about 3.70 percent alkali metal nitrate ion.

(i) A composition as described in section (a) above which further includes a corrosion inhibitor system including, in weight percent based on an aqueous composition, from about 0.42 to about 3.0 percent carboxymethylthiosuccinic acid, from about 0.017 to about 0.42 percent ricinoleic acid, from about 0.007 to about 0.083 percent Moiety of Benzotriazole, from about 0.50 to about 1.50 percent mercaptobenzothiazole, from about 0.42 to about 4.0 percent benzoate ion, from about 0.33 to about 3.3 percent Nitrite ion, from about 0.083 to about 3.0 percent alkyl benzene sulfonate/CONCO AAS-98S, the alkali metal being one of sodium, lithium or potassium, and the composition further including either (1) from about 0.37 to about 3.70 percent alkali metal nitrate ion, or (2) from about 0.042 to about 2.0 percent benzoic acid or alkali metal benzoate.

While there have been described what are at present considered to be the preferred embodiments of the present invention, it will be apparent to those skilled in the art that various changes, modifications and alterations may be made in the teachings of the present invention without departing from the intended spirit and scope thereof. Accordingly, it is intended that the present invention only be limited by the terms of the following claims.

I claim:

1. An additive for addition to a fluid mixture comprising the coolant fluid for an engine comprising, by weight:
   from about 0.017 to about 0.42 percent ricinoleic acid,
   from about 0.007 to about 0.083 percent moiety of benzotriazole, from about 0.50 to about 1.5 percent mercaptobenzothiazole, from about 0.17 to about 4 percent styrene maleic anhydride with a molecular weight of between 200 and 3500, from about 0.42 to 2 percent benzoic acid, from about 0.42 to about 4.0 percent benzoate ion, from about 0.33 to about 3.3 percent nitrite ion, from about 0.37 to about 3.7 percent nitrate ion and from about 0.42 to about 3 percent carboxymethylmercaptosuccinic acid.

2. An additive for addition to a fluid mixture comprising the coolant fluid for an engine comprising, by weight:
   about 2 percent sebacic acid, practical, about 0.2 percent ethoxylated nonylphenol, about 0.5 percent styrene maleic anhydride with a molecular weight of between 200 and 3500, about 0.1 percent polyoxyalkylene glycol, about 0.05 percent polypropylene glycol 1025, about 1.25 percent disodium tetraborate, 5 Mol. $H_2O$, about 7.05 percent sodium hydroxide 50%, and 0.6 percent ricinoleic acid, practical, about 1 percent mercaptobenzothiazole, dry 2-MBT (Azole), about 1.5 percent sodium benzoate, about 0.23 percent moiety of benzotriazole, about 2 percent sodium sarcosine, about 1.5 percent sodium nitrate, about 0.02 percent, about 0.8 percent N-benzylethanolamine and about 0.05 percent phenolphthalein.

3. An additive for addition to a fluid mixture comprising the coolant fluid for an engine comprising, by weight:
   about 0.2 percent ricinoleic acid, practical, about 0.15 percent moiety of benzotriazole, about 6.9 percent sodium hydroxide, about 1 percent mercaptobenzothiazole, about 0.2 percent ethoxylated surfactant, about 0.5 percent styrene maleic anhydride with a molecular weight of between 200 and 3500, about 0.4 percent sodium dodecylbenzene sulfonate, about 1.5 percent benzoic acid, about 2.50 percent sodium benzoate, about 0.4 percent sodium nitrite, about 4 percent sodium nitrate, abut 4.25 percent carboxymethylmercaptosuccinic acid, about 0.8 percent N-benzylethanolamine, about 0.1 percent polyoxyalkylene glycol, about 0.05 percent phenolphthalein.

4. A scale preventive, deposition resistant, aqueous composition comprising a scale preventive system, said preventive system including in weight percent based on said aqueous composition:
   from about 0.170 to about 4.0 percent Styrene Maleic Anhydride-copolymer having a molecular weight of from 200 to 3500, modified amide/imide;
   further including a corrosion inhibitor system including, in weight percent based on an aqueous composition,
   from about 0.170 to about 0.420 percent ricinoleic acid and/or its derivatives,
   from about 0.007 to about 0.083 percent triazole moiety of benzotriazole,
   from about 0.50 to about 1.50 percent thiazole or mercaptobenzothiazole,
   from about 0.42 to about 4.0 percent benzoate ion and
   from about 0.33 to about 3.30 percent nitrate ion.

5. A composition of claim 4 which further includes, in weight percent based on an aqueous composition,
   from about 0.420 to about 3.0 percent carboxymethylmercaptosuccinic acid.

6. A composition of claim 5 in which the alkali metal is taken from the group consisting of sodium, lithium and potassium.

7. A composition of claim 5 further including,
   from about 0.042 to about 2.0 percent benzoic acid.

8. A composition of claim 4 which further includes a corrosion inhibitor system including, in weight percent based on an aqueous composition;
   from about 0.17 to about 3.0 percent sebacic acid and/or alkali metal sebacate, from about 0.42 to about 3.0 percent alkali metal sarcosinate, from about 0.017 to about 0.42 percent ricinoleic acid, from about 0.007 to about 0.083 percent moiety of benzotriazole, from about 0.50 to about 1.50 percent mercaptobenzothiazole, from about 0.42 to about 4.0 percent benzoate ion.

9. A composition as claimed in claim 8 in which the alkali metal is taken from a group consisting of sodium, lithium and potassium.

10. A composition as claimed in claim 8 which further includes, from about 0.37 to about 3.70 percent alkali metal nitrate ion.

11. A composition of claim 4 which further includes a corrosion inhibitor system including, in weight percent based on an aqueous composition:

from about 0.17 to about 3.0 percent sebacic acid and/or alkali metal sebacate, from about 0.42 to about 3.0 percent N-acylated Sarcosines, from about 0.017 to about 0.42 percent ricinoleic acid, from about 0.007 to about 0.083 percent Moiety of Benzotriazole, from about 0.50 to about 1.50 percent mercaptobenzothiazole, from about 0.42 to about 4.0 percent benzoate ion.

12. A composition as claimed in claim 11 in which the alkali metal is taken from the group consisting of sodium, lithium and potassium.

13. A composition as claimed in claim 12 which further includes, from about 0.37 to about 3.70 percent alkali metal nitrate ion.

14. A composition of claim 4 which further includes a corrosion inhibitor system including, in weight percent based on an aqueous composition:

from about 0.42 to about 3.0 percent carboxymethylthiosuccinic acid, from about 0.017 to about 0.42 percent ricinoleic acid, from about 0.007 to about 0.83 percent Moiety of Benzotriazole, from about 0.50 to about 1.50 percent mercaptobenzothiazole, from about 0.42 to about 4.0 percent benzoate ion technical grade, from about 0.33 to about 3.3 percent Nitrite ion, from about 0.083 to about 3.0 percent alkyl benzene sulfonate/linear alkyl aryl sulfonic acid.

15. A composition as claimed in claim 14 in which the alkali metal is taken from the group consisting of sodium, lithium and potassium.

16. A composition as claimed in claim 15 which further includes, from about 0.37 to about 3.70 percent alkali metal nitrate ion.

17. A composition as claimed in claim 15 which further includes from about 0.042 to about 2.0 percent benzoic acid.

* * * * *

UNITED STATES PATENT AND TRADEMARK OFFICE
CERTIFICATE OF CORRECTION

PATENT NO. : 4,711,735
DATED : December 8, 1987
INVENTOR(S) : GULLEY

It is certified that error appears in the above-identified patent and that said Letters Patent is hereby corrected as shown below:

Column 1, line 60, "alkyline" should be --alkaline--.

Column 7, Table C, line 63, "ASTM 3-1384" should be --ASTM D-1384--.

Signed and Sealed this

Twenty-first Day of June, 1988

Attest:

DONALD J. QUIGG

Attesting Officer

Commissioner of Patents and Trademarks